United States Patent [19]

Jean et al.

[11] 4,178,470

[45] Dec. 11, 1979

[54] INSULATOR FOR ELECTRICAL CONDUCTORS AND METHOD OF STRINGING SUCH CONDUCTORS ON INSULATORS

[75] Inventors: Leonard P. Jean, Nashua; Ernest J. Lachance, Sr., Milford, both of N.H.

[73] Assignee: Hendrix Wire & Cable Corp., Milford, N.H.

[21] Appl. No.: 830,671

[22] Filed: Sep. 6, 1977

[51] Int. Cl.² .................. H01B 17/16; H01B 17/22; H02G 1/04

[52] U.S. Cl. ..................... 174/168; 85/61; 151/37; 174/156; 174/194; 254/134.3 PA

[58] Field of Search ............ 174/40 R, 43, 45 R, 174/154, 155, 156, 165, 168, 169, 170, 172, 174, 194; 85/61, DIG. 2; 151/37; 248/65, 74 R; 254/134.3 R, 134.3 PA

[56] References Cited

U.S. PATENT DOCUMENTS

| | | | |
|---|---|---|---|
| 3,139,482 | 6/1964 | Peters et al. | 174/170 X |
| 3,437,299 | 4/1969 | Lindsey | 174/169 X |
| 3,437,742 | 4/1969 | Lindsey | 174/169 |
| 3,437,743 | 4/1969 | Lindsey | 174/169 |
| 3,739,075 | 6/1973 | Jean et al. | 174/194 X |
| 3,924,055 | 12/1975 | Moore et al. | 174/146 X |

FOREIGN PATENT DOCUMENTS

| | | | |
|---|---|---|---|
| 7255 | of 1907 | United Kingdom | 151/37 |
| 180780 | 6/1922 | United Kingdom | 174/168 |
| 898026 | 6/1962 | United Kingdom | 85/61 |

*Primary Examiner*—Laramie E. Askin

*Attorney, Agent, or Firm*—Thompson, Birch, Gauthier & Samuels

[57] ABSTRACT

This disclosure is directed to an insulator for clamping and holding an electrical conductor above the ground for aerial power distribution and transmission. The insulator includes a body member, first jaw means integral with one end of the body member, slide means, second and third jaw means integral with the slide means and means for mounting the slide means in the end of the body member for longitudinal movement substantially normal to the first jaw means. It also includes bolt means for causing movement of the third jaw means towards a concave neck portion of the body member for gripping a conductor between the third jaw means and the body member.

This disclosure is also directed to a method of stringing an electrical conductor on a plurality of insulators which are supported above the ground on a series of poles. The method utilizes a plurality of stringing devices each of which comprises two semi-tubular members having means for detachably securing them together to provide a circular passage between them. The conductor is pulled through a series of stringing devices which are held between the generally concave surfaces of the insulator bodies and generally concave surfaces of jaw means on slide means of the insulators. The conductor is then tensioned. Then the stringing devices are removed from the conductor by sliding them longitudinally of the conductor and separating the semi-tubular members. Then the jaw means of the insulator are closed to grip the conductor.

8 Claims, 18 Drawing Figures

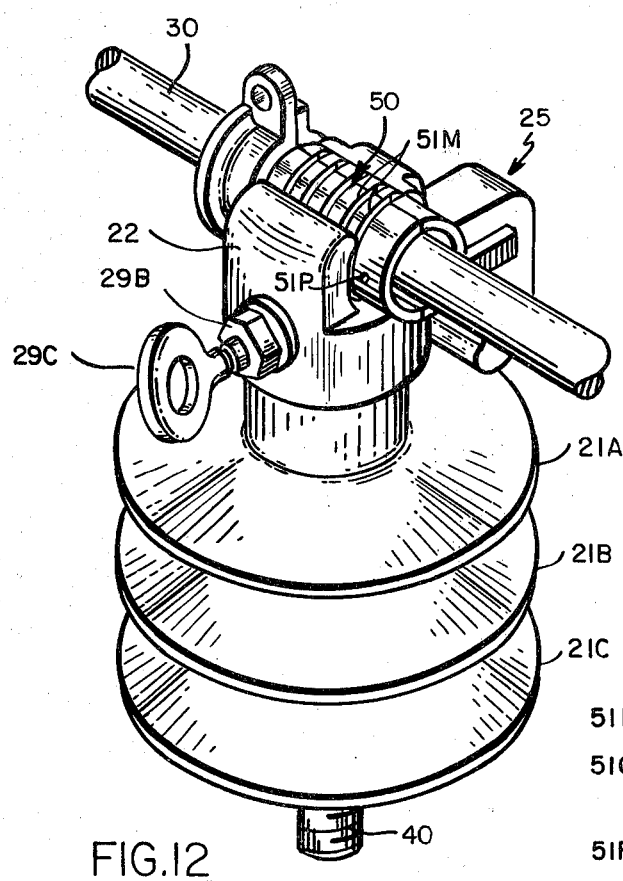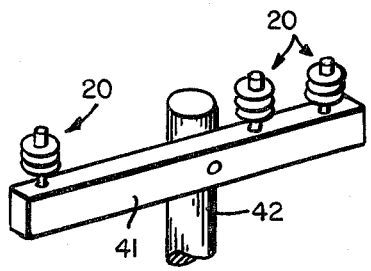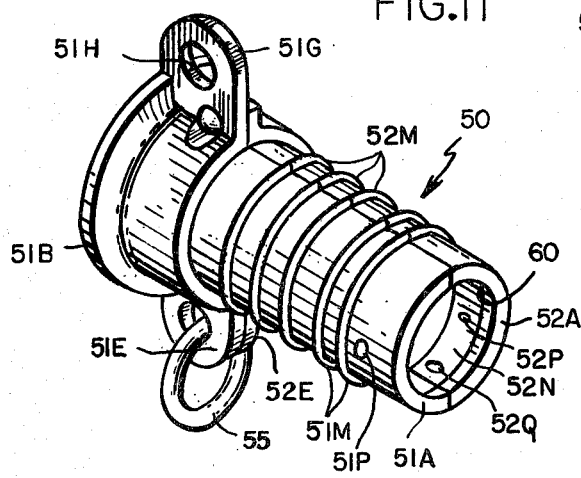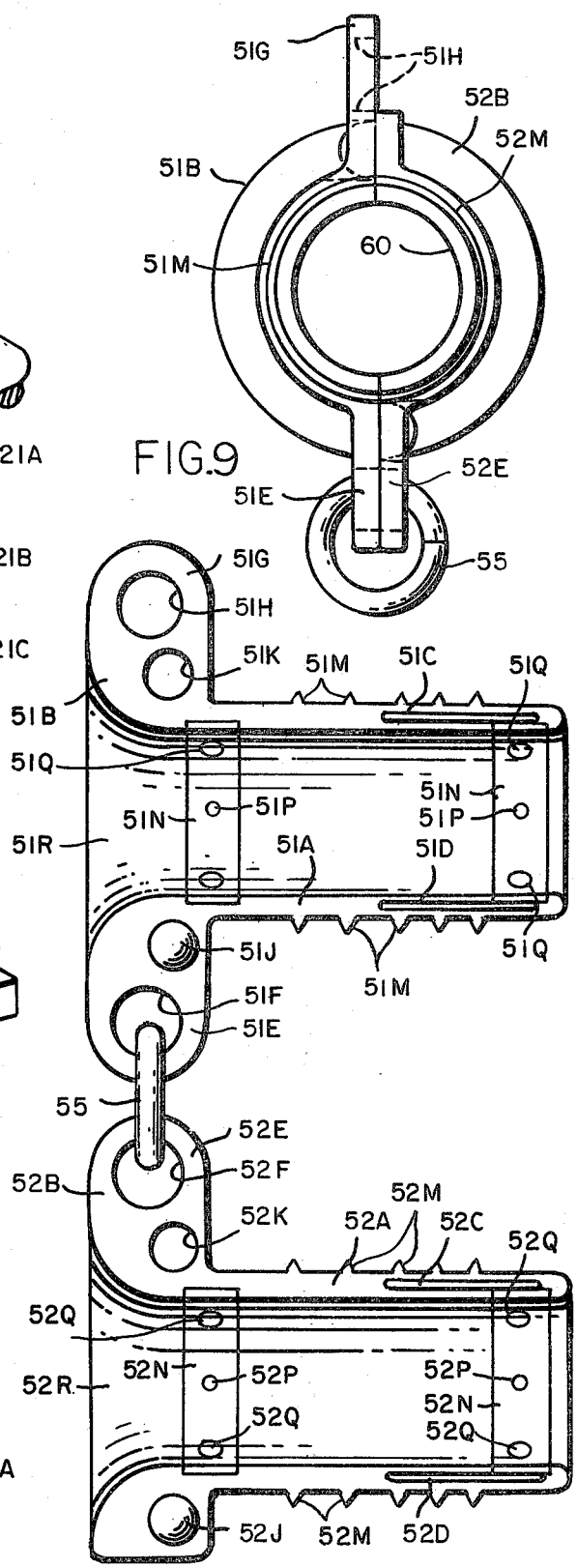

INSULATOR FOR ELECTRICAL CONDUCTORS AND METHOD OF STRINGING SUCH CONDUCTORS ON INSULATORS

CROSS-REFERENCE TO RELATED APPLICATION

Subject matter disclosed herein is disclosed and claimed in copending patent application filed Sept. 6, 1977 and herewith incorporated by reference herein: Ser. No. 830,660, filed by Leonard Paul Jean and Ernest Joseph LaChance, Sr., now U.S. Pat. No. 4,134,574.

BACKGROUND OF THE INVENTION

In one aspect, this invention relates to insulators for clamping or holding an electrical conductor above the ground for aerial power distribution and transmission.

In another aspect, the invention relates to a method of stringing such a conductor on a plurality of insulators which are supported above the ground on a series of poles which are to form the distribution or transmission line.

The conductors may be either insulated cables or conductors of the bare wire type.

There has been a long-felt need for such an insulator which is economical to manufacture, at least the major portions of which may be made of moldable plastic material which has a low dielectric constant and is weather and track resistant, which is easy to manipulate to clamp or hold a conductor without damaging the conductor, which reduces radio and television interference, increases the leakage resistance path from conductor to ground, reduces the components of the insulator and is designed to accept a conductor stringing device which allows the conductor to be installed and tensioned on a plurality of insulators without the use of the customary stringing roller blocks or the usual temporary support of the conductor while the stringing device is removed and a permanent insulator is installed.

There has also been a long-felt need for a stringing method which is economical in use, which eliminates the use of stringing roller blocks and temporary support of the conductor while the stringing device is removed and the permanent insulator is installed and in which neither the insulator nor the stringing device is subjected to excessive wear when the conductor is pulled through the stringing device during the stringing steps.

U.S. Pat. No. 3,739,075 dated June 12, 1973 owned by Hendrix Wire and Cable Corporation, the assignee of the present application, discloses one unsuccessful attempt to meet said long-felt needs. In the insulator of that patent, the body of the insulator was provided with a cylindrical eye 15 having a circular passage 16 through which the conductor cable was pulled during the stringing step. Because the diameter of the passage 16 was much greater than the diameter of the conductor, it was necessary to use wire means 38, wire means 43 or elastic tie means 45 to hold the conductor in the passage 16. In addition, the cylindrical eye 15 was not made of a sufficiently wear resistant plastic to prevent excessive wear when the conductor was pulled through it during stringing.

Another attempt to fill the long-felt need is a metallic clamp made by Lapp Insulator Co., Inc. which is secured to the end of an insulator. It had a lower metallic member having a groove to receive the lower portion of the conductor and an upper metallic member which is placed above the upper portion of the conductor. These metallic members were clamped about the conductor by two metal bolts which passed into interiorly threaded passages. Lapp recommended use of a torque wrench to rotate the bolts to clamp the metallic members about the conductor with the correct amount of pressure to hold the conductor, the clamp was expensive to install and four different sizes were required to cover a range of conductors having diameters of from $\frac{1}{4}$" to $1\frac{1}{2}$". In addition, when these metallic clamps were used with a covered conductor, a voltage difference existed between the conductor and the clamp and between the clamp and the metallic supporting base of the insulator, these voltage differences were not stable but varied with the weather conditions and the contamination and the arcing produced radio and television noise as as well as damage to the conductor covering material.

Reliable Electric Company's Synthetic Products Company Division, attempted to meet the long-felt need with a temporary stringing pin insulator which accommodates conductors up to $1\frac{1}{2}$" in diameter. This stringing pin insulator is shown in U.S. Pat. No. Des.235,190. As an accessory, a channel shaped replaceable insert is available to limit wear of the temporary insulator but it is not cylindrical and cannot be rotated to distribute wear from job to job.

Other attempts to meet the long-felt need have been made by Lindsey Manufacturing Company of Pasadena, California. Each of them consisted of a six-piece metallic conductor clamp adapted for mounting on the end of a porcelain insulator. They each had the same deficiencies as the above described Lapp metallic clamp except that only one bolt was used to move one of the clamping members into gripping engagement with the conductors.

One of the Lindsey clamping assemblies is shown and described in U.S. Pat. No. 3,437,743. It comprises a metal bracket secured to an insulator. The main body of the clamp is pivotally secured in the bracket by a pintle and a cap screw. The main body has an upwardly facing conductor seat. A jaw is movable towards and away from the conductor seat by a second cap screw which acts against a lock washer. This clamping assembly is also shown in U.S. Pat. No. Des.209,667.

Another Lindsey clamping assembly is shown and described in U.S. Pat. No. 3,437,742 and Des.209,668. This assembly is similar to the assembly described above except that the jaw is movable vertically by the cap screw and its bolt can be tilted to a position in which the jaw does not cover the conductor seat.

The Lindsey conductor clamp shown in U.S. Pat. No. Des.213,049 is substantially the same as the clamp shown and described in U.S. Pat. No. 3,437,742 except that the bolt which actuates the jaw cannot be tilted.

To the best of our knowledge, the above described prior art is the closest prior art to the insulator and the stringing method of the present invention.

BRIEF SUMMARY OF THE INVENTION

One object of this invention is to provide a new insulator for clamping or holding an electrical conductor above the ground.

Another object is to provide such an insulator which is economical to manufacture and is durable in use.

A further object is to provide such an insulator which is adjustable to accommodate conductors having diameters up to $1\frac{3}{4}$".

Yet another object is to provide such an insulator which is comprised of only three parts at least the major portions of which are molded from plastic materials.

A still further object is to provide such an insulator which is easy to manipulate to clamp and hold a conductor above the ground without damaging the conductor.

Another object is to provide such an insulator which reduces radio and television interference.

A further object is to provide such an insulator which increases the resistance path from conductor to ground.

Yet another object is to provide such an insulator which is capable of use on both a straight distribution or transmission line and one which turns at an angle.

A still further object is to provide such an insulator which will accept a conductor stringing device which allows a conductor to be installed and tensioned on a plurality of insulators without the use of the customary roller blocks or the Synthetic Products Company stringing pin insulator and the usual temporary support of the conductor while the stringing device is removed and a permanent insulator is installed.

Another object of the invention is to provide a new method of stringing an electrical conductor in a plurality of insulators.

A further object is to provide such a method which is economical in use.

Yet another object is to provide such a method utilizing a stringing device which can be easily removed from the conductor after it has performed its function.

A still further object is to provide such a method in which the stringing device can be used repeatedly from job to job.

Another object is to provide such a method wherein the conductor is not damaged.

Further objects and advantages of the insulator and method inventions will be apparent to persons skilled in the art from the following description taken in conjunction with the accompanying drawings.

In general, one embodiment of an insulator embodying this invention includes a body, first jaw means integral with one end of the body of the insulator having a generally concave inner surface and slide means. It also includes means for mounting the slide means in that end of the body for longitudinal movement substantially normal to the first jaw means. In addition, it includes second jaw means integral with the slide means and the second jaw means has a generally concave inner surface facing the generally concave inner surface of the first jaw means. Furthermore, it includes first passage means extending through the wall of that end of the body beneath the first jaw means, and an interiorly threaded second passage means extending longitudinally within the slide means with its axis substantially coinciding with the longitudinal centerline of the first passage means. It also includes first bolt means having a portion extending through the first passage means and into the second passage means, and at least the portion of this bolt means which extends into the second passage means is provided with an exteriorly threaded portion for engaging the threads of the second passage means. The first bolt means also includes first head means and a portion of reduced diameter adjacent to the first head means, whereby upon rotation of the first bolt means by manipulation of the first head means, a conductor is gripped between the first and second jaw means and upon reaching a predetermined gripping pressure, the first bolt means is sheared at its portion of reduced diameter and the first head means is separated from the first bolt means.

In a preferred embodiment, the means for mounting the slide means comprises slot means in that end of the body which extends substantially normal to the first jaw means, a pair of groove means, one extending longitudinally of one side of the slot means and the other extending longitudinally of the other side of the slot means and a pair of outwardly projecting members on opposite sides of the slide means, the outwardly projecting members being slideable longitudinally in the groove means.

In still another preferred embodiment, the first bolt means also includes a second head means located between the portion of reduced diameter and the exteriorly threaded portion of the first bolt means and the second head means is shaped to receive a wrench for rotation of the first bolt means.

In yet another embodiment, the first head means is provided with eye means adapted to receive a hot stick or rod shaped tool for rotating the first head means.

In another embodiment, at least the major portions of the body, slide means and jaw means are molded from a moldable plastic material which has a low dielectric constant and is weather and track resistant.

In one embodiment, the first bolt means is made from a moldable plastic material which has a low dielectric constant and is weather and track resistant such as glass-filled nylon.

In a preferred embodiment, the body includes second bolt means, an axial passage for receiving one end of the second bolt means and means at the other end of the second bolt means for securing it and the insulator to a pole of an electrical transmission or distribution line.

In yet another embodiment, the surface of the second head means of the first bolt means which faces the body includes at least one protrusion means which engages the body when the first bolt means is tightened and a conductor is gripped between the first and second jaw means, whereby accidental loosening of the first bolt means is prevented. In a preferred embodiment, this surface of the second head means is provided with at least two protrusion means which are positioned substantially opposite to each other.

In still another embodiment, the walls of the passage which extends through the body beneath the first jaw means diverge from the outer end of the passage towards the inner end thereof.

In general, another embodiment of an insulator embodying this invention includes a body, first jaw means integral with one end of the body of the insulator having a generally concave inner surface and slide means. It also includes means for mounting the slide means in that end of the body for longitudinal movement substantially normal to the first jaw means. In addition, it includes second jaw means integral with the slide means; and the second jaw means has a generally concave inner surface facing the generally concave inner surface of the first jaw means. Furthermore, it includes first passage means extending through the wall of that end of the body beneath the first jaw means, and an interiorly threaded second passage means extending longitudinally within the slide means with its axis substantially coinciding with the longitudinal centerline of the first passage means. It also includes third jaw means integral with the slide means and the third jaw means has a generally concave inner surface which extends in a direction from the slide means opposite to the direction in which the second jaw means extends.

In a preferred embodiment, the body includes a plurality of spaced fin means which extend outwardly therefrom generally normal to the longitudinal axis of the body.

In yet another embodiment, the generally concave surface of the third jaw means faces a generally concave surface of a portion of the neck of the body adjacent to the upper fin means and the free end of the third jaw means is adjacent to the upper fin means, whereby upon rotation of the first bolt means a conductor is gripped between the concave inner surface of the third jaw means and the generally concave surface of the neck portion of the body.

In still another embodiment, the means for mounting the slide means includes slot means in the end of the body which extends substantially normal to the first jaw means, a pair of groove means, one extending longitudinally of one side of the slot means and the other extending longitudinally of the other side of the slot means and a pair of outwardly projecting members on opposite sides of the slide means and these outwardly projecting members are slideable longitudinally in the groove means.

In another embodiment, the inner ends of the pair of outwardly projecting members of the slide means terminate at localities which are spaced inwardly from the end of the slide means which is opposite to the third jaw means, whereby upon unscrewing the first bolt means the third jaw means end of the slide means can be rotated upwardly a sufficient distance to permit a conductor and a stringing device to be passed through the gap which is formed between the end of the third jaw means and the periphery of the upper fin means and by rotation of the third jaw means downwardly and tightening the first bolt means, the stringing device or the conductor is gripped between the generally concave surface of the third jaw means and the generally concave surface of the neck portion of the body.

In general, the method embodying this invention includes providing a plurality of insulator bodies each of which has a portion which includes a generally concave surface, providing a plurality of slide means each of which is slideable transversely of an insulator body and comprises jaw means having a generally concave surface facing the generally concave surface of its associated insulator body, providing a plurality of bolt means for moving the slide means and the said jaw means towards and away from the generally concave surfaces of their associated insulator bodies, and providing a plurality of stringing devices each of which comprises first and second semi-tubular members having means for detachably securing them together to provide a circular passage between them and which method comprises the steps of mounting a plurality of assembled insulators, slide means and bolt means on a series of poles of a distribution or transmission line, mounting a series of stringing devices between the jaw means and the generally concave surfaces of the bodies of the insulators by manipulation of the bolt means, pulling a conductor through the circular passages of the stringing devices, tensioning the conductor to provide the desired amounts of sag between the poles, opening the jaw means of the insulators by manipulation of the bolt means, sliding the stringing devices longitudinally of the conductor outwardly of the jaw means and the generally concave surfaces of the bodies, separating the semi-tubular members of the stringing devices to remove them from the conductor, and closing the jaw means of the insulators to grip the conductor between them and the generally concave surfaces of the bodies by manipulation of the bolt means to move the jaw means towards the generally concave surfaces of the bodies.

In one embodiment of the method, each of the generally concave surfaces of the insulator bodies comprises a concave surface of another jaw means which faces the generally concave surface of the jaw means of the slide means.

In another embodiment of the method, each of the generally concave surfaces of the insulator body comprises a generally concave surface of a portion of the neck of the insulator body which faces the generally concave surface of the jaw means.

In yet another embodiment of the method, each of the bolt means comprises a portion of reduced diameter and the method includes the step of moving the jaw means towards the generally concave surfaces of the insulator bodies to grip the conductor by tightening the bolt means until they shear at their portions of reduced diameter thereby preventing damage to the conductor, the jaw means and the insulator bodies and preventing overstressing the bolt means.

In a still further embodiment of the method, one of each of the pairs of semi-tubular members of the stringing devices comprises ear means projecting outwardly from the periphery of the semi-tubular member, and the method includes the step of sliding each of the stringing devices longitudinally of the conductor outwardly of the jaw means and the associated generally concave surfaces of the insulator body by manipulation of the ear means.

It will be apparent to persons skilled in the art that the insulator invention and the method invention have solved the above described, long-felt needs and satisfied the above described objects.

BRIEF DESCRIPTION OF THE DRAWINGS

FIG. 8 is an isometric view of a fully assembled device for stringing an electrical conductor through an insulator embodying the invention;

FIG. 9 is an enlarged end view of the stringing device of FIG. 8 showing the circular central passage, the end flanges and the outwardly extending ear means of the stringing device.

FIG. 10 is an enlarged top plan view of the stringing device partially disassembled showing the tongues and grooves formed in the edges of the semi-tubular parts of the device for detachably securing them together when they are assembled to the form shown in FIG. 8;

FIG. 11 is a fragmentary isometric view of a pole of a transmission or distribution power line with three insulators embodying the invention mounted on the cross piece of the pole;

FIG. 12 is an isometric view of an insulator showing the upwardly extending first and second jaw means of the insulator gripping a stringing device and a conductor extending through the stringing device;

DETAILED DESCRIPTION OF THE INSULATOR AND STRINGING METHOD SHOWN IN THE DRAWINGS

Figure 1:
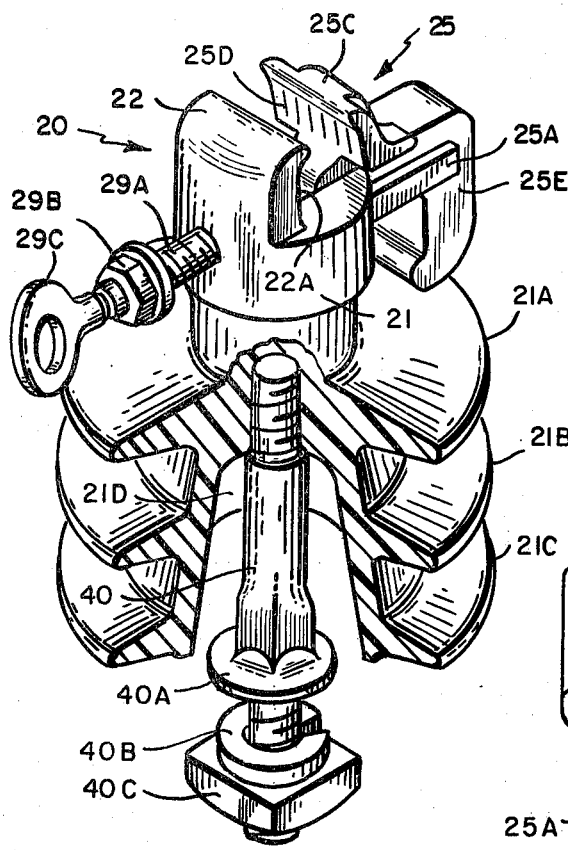
FIG. 1 is an isometric view of an insulator embodying the invention, partly broken away to show its interior construction.

The insulator 20 shown in the drawings comprises a body 21, having first jaw means 22 extending upwardly therefrom. The first jaw means has a generally concave inner surface 22A.

The generally U-shaped slot means 23 extends through the body substantially normal to the first jaw means and it comprises a pair of groove means 23A and 23B, one extending longitudinally of one side of the slot means and the other extending longitudinally of the other side thereof.

The insulator also comprises slide means indicated generally by the numeral 25. This slide means comprises a pair of outwardly projecting members 25A on opposite sides thereof which are slideable longitudinally in said groove means.

A passage 27 extends through the wall of the body beneath the first jaw means.

An interiorly threaded passage 25B extends longitudinally within the slide means and its axis substantially coincides with the longitudinal centerline of the passage 27.

Second jaw means 25C extends upwardly from the slide means. This jaw means has a generally concave inner surface 25D facing the generally concave inner surface 22A of the first jaw means 22.

First bolt means indicated generally by the numeral 29 has an exteriorly threaded portion 29A the threads of which engage the threads of the interiorly threaded passage 25B of the slide means.

The first bolt means comprises a second head means 29B which is shaped to receive a wrench for rotating the first bolt means. It also comprises a first head means 29C which is provided with eye means 29D adapted to receive a hot stick or a rod shaped tool for use in rotating the first bolt means.

The first bolt means also comprises a portion of reduced diameter 29E between the first and second head means.

Figure 14:
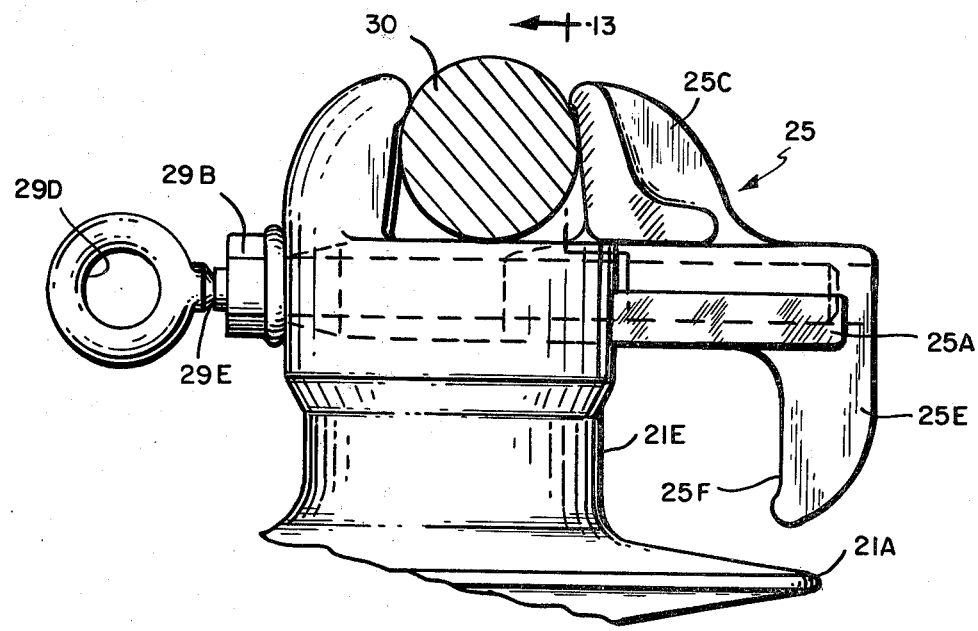
FIG. 14 is a side elevation of an insulator showing a conductor gripped between the first and second jaw means after the stringing device has been removed.

The surface of the second head means which faces the body is provided with a pair of protrusions 29F which engage the body when the first bolt means is tightened so that a conductor 30 is gripped between the first and second jaw means as shown in FIG. 14. These protrusions serve as an anti-loosening device like a lock washer.

The thread of the first bolt means is non-standard providing a rapid feed and preventing substitution of the first bolt means with a standard metallic bolt.

To tighten the first and second jaw means about a conductor, a hot stick or other tool is inserted in the orifice 29D of the first head means by a workman and he rotates the first bolt means manually until it shears at the portion of reduced diameter 29E and the first head means falls away from the second head means. This prevents damage to the conductor and jaw means and prevents overstressing the first bolt means.

The insulator will accommodate conductors having diameters up to 1¾".

When it becomes necessary to remove the cable, the first bolt means is loosened by a wrench which fits the second head means 29B.

The insulator body is provided with a series of spaced fin means 21A, 21B and 21C which extend outwardly therefrom generally normal to the longitudinal axis of the body. These fins increase the leakage resistance path from the conductor to ground as is well known in the prior art.

Preferably, at least the major portions of the insulator body and slide means are made of moldable plastic material which has a low dielectric constant and is weather and track resistant. Examples are high-density, track-resistant polyethylene, polypropylene and similar tough, electric grade insulating materials.

Preferably the first bolt means is made of glass-filled nylon colored black for weather resistance. A specific type of glass filled nylon is Nylon 6-6, 30% glass-filled, obtainable from both Dupont and Liquid Nitrogen Processing Corp.

The body 21 comprises an axial passage 21D, the upper portion of which is interiorly threaded to receive the exteriorly threaded upper end of the second bolt means 40. This second bolt means may be made of metal, a preferred embodiment being a galvanized steel body containing a lead thread at the top as is well known in the prior art. This second bolt means typically includes a flange 40A, a lock washer 40B and a nut 40C.

Figure 2:
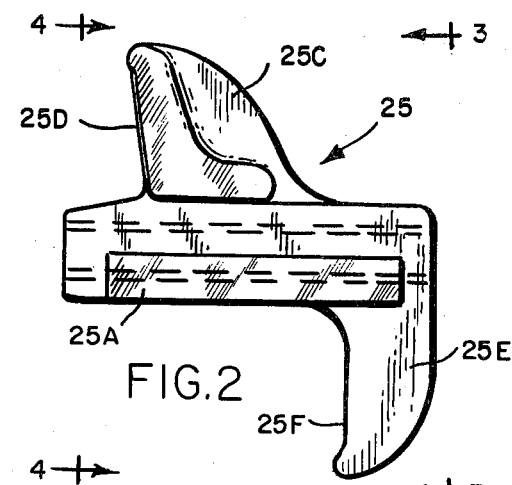
FIG. 2 is a side elevation of the slide means removed from the insulator of FIG. 1.
Figures 3, 4:
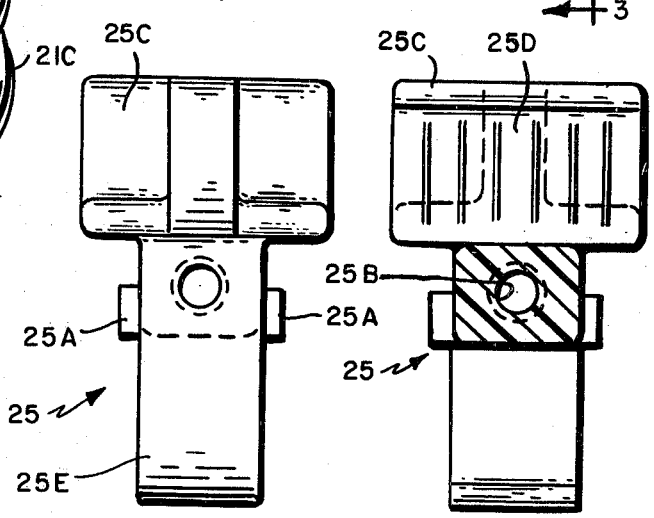
FIG. 3 is an end elevation of the slide means looking in the direction of the arrows 3—3 of FIG. 2.
FIG. 4 is a vertical section of the slide means taken on the line 4—4 of FIG. 2.
Figure 5:
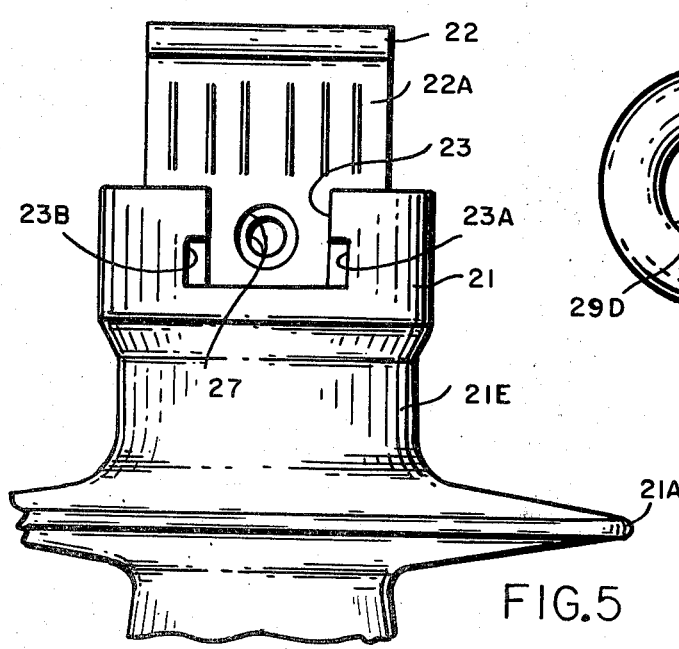
FIG. 5 is a side elevation of the upper portion of the insulator looking at the open end of the passage for slideably receiving the slide means shown in FIGS. 2, 3 and 4.
Figure 6:
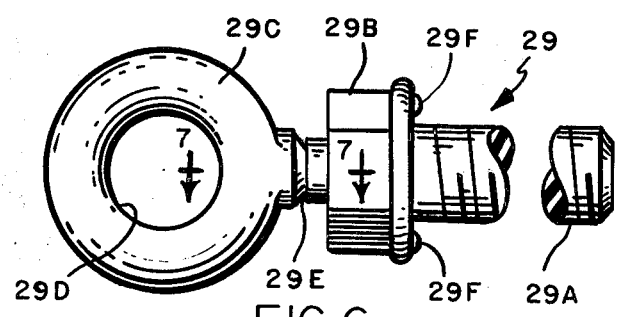
FIG. 6 is a top plan view of a first bolt means with parts broken away.
Figure 7:
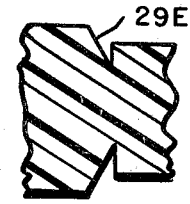
FIG. 7 is a longitudinal section of the first bolt means taken on the line 7—7 of FIG. 6.

The second bolt means is used to mount an insulator 20 on a cross arm 41 of a transmission or distribution line pole 42 as shown in FIG. 11. It can also be used to mount an insulator on a bracket which is secured to the side of a transmission of distribution line pole as shown in FIGS. 2 and 5 of U.S. Pat. No. 3,739,075.

The slide means 25 also comprises downwardly extending third jaw means 25E which has a generally concave inner surface 25F facing the neck portion 21E of the body above the upper fin means 21A as shown in FIG. 14.

Figure 17:
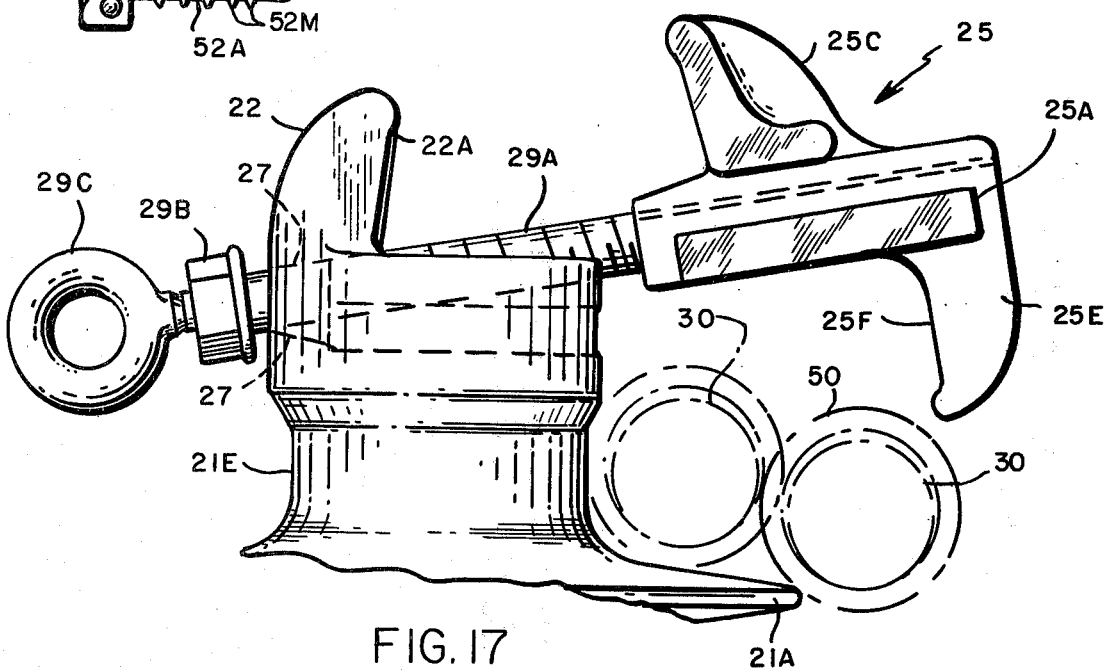
FIG. 17 is a side elevation showing the slide means and first bolt means of the insulator rotated upwardly to provide a gap between the lower end of the third jaw means and upper fin means of the insulator, the gap being of sufficient width to receive a stringing device and a conductor cable which are shown in dot dash lines.
Figure 18:
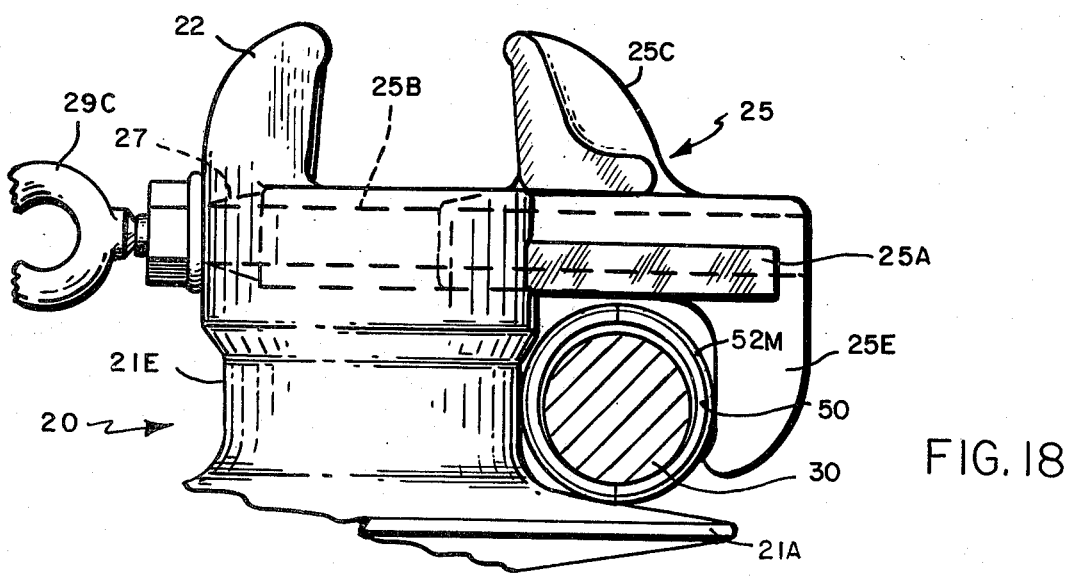
FIG. 18 is a side elevation like FIG. 17 showing the third jaws means closed to grip a stringing device between it and a portion of an insulator, the conductor cable being shown in section.

The inner ends of the pair of outwardly projecting members 25A of the slide means terminate at localities which are spaced inwardly of the end of the slide means which is opposite to the third jaw means as shown in FIG. 17. The walls of the passage 27 diverge inwardly as shown in FIGS. 17 and 18. By unscrewing the first bolt means 29, the combined third jaw means and first bolt means can be rotated upwardly a sufficient distance to permit a conductor 30 and stringing device 50 to be passed through the gap which is formed between the lower end of the third jaw means and the periphery of the upper fin means as shown in dot dash lines in FIG. 17. When the combined third jaw means and first bolt means are rotated downwardly and the first bolt means 29 is tightened, the stringing device 50 is gripped between the generally concave surface of the third jaw means and the generally concave surface of the neck portion 21E of the body as shown in FIG. 18.

In tightening the first bolt means to grip the conductor 30 after the stringing device has been removed, the first head means is turned until the first bolt means shears at the portion of reduced diameter 29E thus attaining the advantages described above.

THE METHOD ASPECT OF THE INVENTION

The novel method embodies the use of a stringing device indicated generally by the numeral 50 in FIG. 8. It comprises a first semi-tubular member 51A having outwardly extending flange means 51B and a second semi-tubular member 52A having outwardly extending flange means 52B.

The semi-tubular member 51A is provided with tongue means 51C and groove means 51D. The semi-tubular member 52A is provided with tongue means 52C and groove means 52D.

When the semi-tubular members are moved to the closed position of FIGS. 8 and 9, the tongue means 51C enters the groove means 52D and the tongue means 52C enters the groove means 51D thus detachably securing the two semi-tubular members together.

First ear means 51E projects outwardly from one side of the flange means 51B and second ear means 52E projects outwardly from one side of the flange means 52B. These ear means are provided with transverse orifices 51F and 52F which register when the semi-tubular members are closed as shown in FIGS. 8 and 9.

The ring means 55 passes through the orifices 51F and 52F as shown in FIGS. 9 and 10 thus preventing complete separation of the semi-tubular members.

Third ear means 51G projects outwardly from the flange of the semi-tubular member 51A and this ear means is provided with a transverse orifice 51H for use with a hot stick when the conductor to be strung is to be energized before removal of the stringing device.

When the stringing device is in its assembled positions of FIGS. 8 and 9, a circular passage 60 is formed between them.

The tongue and groove means are so formed that the two semi-tubular members can be separated to the open position of FIG. 10 very easily by a workman.

The semi-spherical projecting members 51J and 52J enter the semi-spherical cavities 52K and 51K respectively when the semi-tubular members are closed, thereby cooperating with the tongue and groove means 51C-52D and 51D-52C to detachably secure the semi-tubular members together.

Spaced rib means 51M and 52M extend around the peripheral surfaces of the semi-tubular members 51A and 52A respectively.

For use with a transmission or distribution line which does not have sections which turn at a substantial angle to each other, the stringing device may be made entirely of a moldable, wear-resistant plastic material. Examples of suitable materials are glass-filled acetal, glass-filled polyphenylene sulfide and glass-filled nylon.

Figure 16:
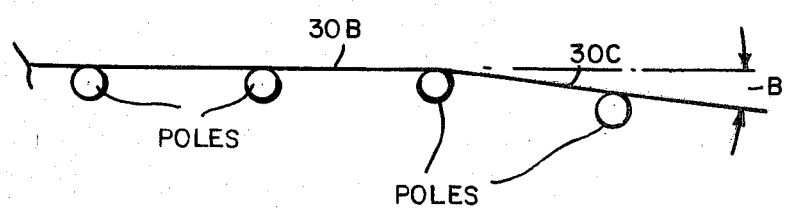
FIG. 16 is a plan view of a transmission or distribution line with two sections of the line turning at a substantial angle to each other.

However, for use with a transmission or distribution line in which sections 30B and 30C turn at a substantial angle to each other, for example at an angle of more than about 5° as shown by the angle B in FIG. 16, spaced metallic strip means 51N and 52N, preferably made of steel, are embedded in the inner surfaces of the semi-tubular members 51A and 52A respectively. These metallic strip means are better able to resist the wearing effect of ropes and conductor cables than all plastic semi-tubular members when ropes and conductor cables are pulled through the stringing device to install the conductor cables in the manner which is described below.

To correctly locate these metallic strip means in the semi-tubular members when the semi-tubular members are molded, locating pins (not shown) are inserted in the centrally disposed orifices 51P and 52P before the plastic material is introduced into the mold. During the molding step, plastic material passes into the end orifices 51Q and 52Q and that plastic material as well as the plastic material which is located adjacent to the sides of the metallic strips securely holds them in the semi-tubular members after the plastic material has set.

The stringing device shown and described herein is claimed in another U.S. patent application signed by us Ser. No. 830,660 filed Sept. 6, 1977, which was filed in the Patent and Trademark Office concurrently with this application, now U.S. Pat. No. 4,134,574.

When a conductor is installed on a series of poles which are arranged in a substantially straight line, the first and second jaw means of the insulators in combination with stringing devices are used.

Figure 15:
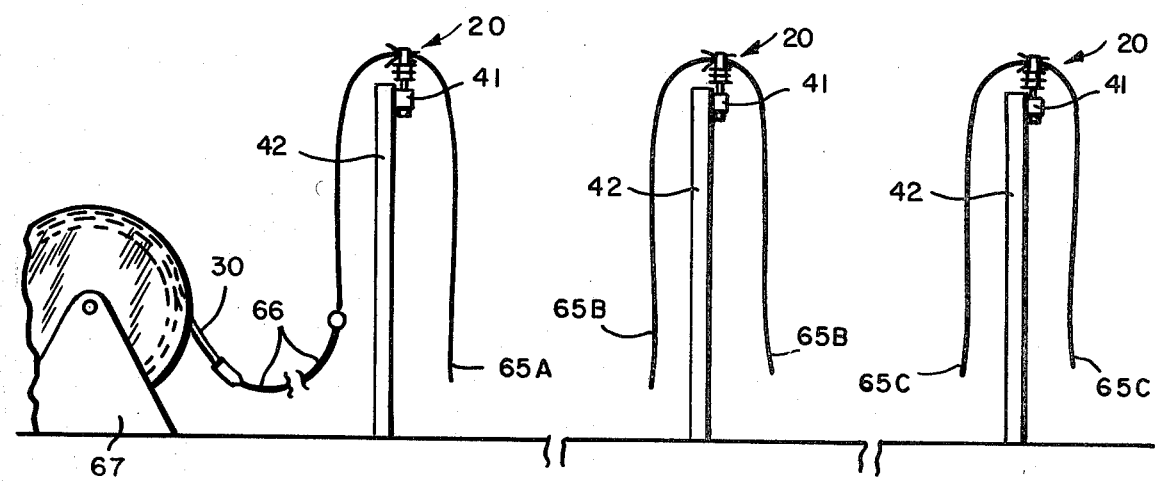
FIG. 15 is a diagrammatic side elevation of three poles of a transmission or distribution line having stringing devices mounted between the first and second jaw means of the insulators, a reel of conductor cable and means for pulling the conductor cable successively through the stringing devices.

First a plurality of insulators 20 are mounted on a plurality of cross arms 41 of poles 42, for example as shown in FIG. 15. Then a plurality of stringing devices 50 are secured between the first and second jaw means of the insulators by tightening the first bolt means without shearing them at their portions of reduced diameter as shown in FIG. 12. The spaced rib means 51M and 52M serve to prevent the stringing devices from being withdrawn longitudinally from the jaw means when they are closed. Then separate hand lines 65A, 65B, 65C are passed from the ground up through the circular passages 60 of the stringing devices. Then one end of the first hand line 65A is attached to the leading end of a pulling rope 66 and the leading end of the pulling rope is pulled thru the passage 60 of the first stringing device by pulling the hand line. Then the first hand line is detached from the pulling rope and the end of the second hand line 65B is attached to the leading end of the pulling rope. The leading end of the pulling rope is then pulled through the circular passage 60 of the second stringing device which is held between the first and second jaw means of the insulator installed on the cross arm of the second pole. Then the leading end of the pulling rope is detached from the second hand line 65B.

The same procedure is repeated with the succeeding hand lines until the pulling rope has been pulled through all of the stringing devices of a plurality of poles, for example eighteen.

The trailing end of the rope has been attached to the leading end of the conductor 30 which may be mounted on a reel 67. Then by means of a winch or other pulling apparatus attached to the leading end of the pulling rope, the conductor is pulled through the passages 60 of the series of stringing devices and the conductor is tensioned so that the sags between the poles are of the desired magnitude. During this step, the convex surfaces 51R and 52R of the flange means 51B and 52B prevent abrasion of the pulling rope and the insulation of the conductor.

Figure 13:
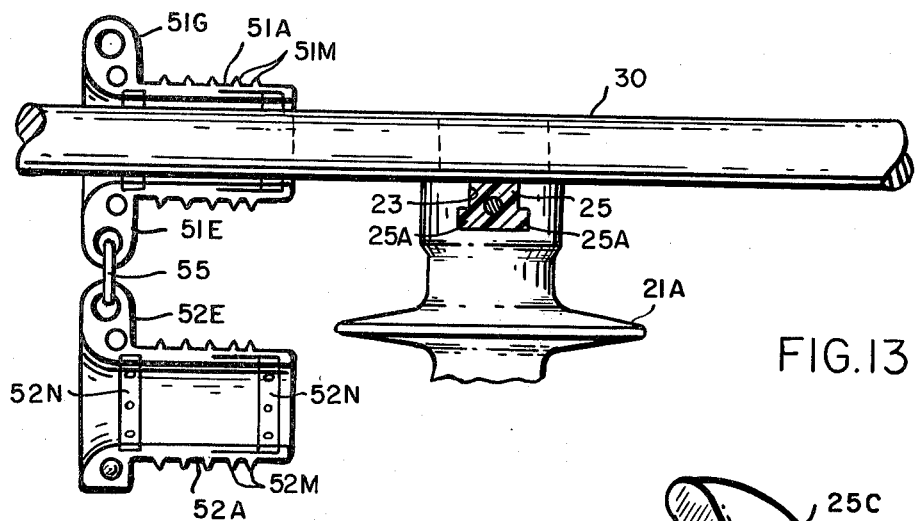
FIG. 13 is a vertical section through the slide means taken on the lines 13—13 of FIG. 14 showing the stringing device slid longitudinally of the conductor after the first and second jaw means of the insulator have been separated slightly and the two halves of the stringing device fully separated ready for removal of the device from the conductor.

Then the first and second jaw means of the insulators are successively opened by loosening the first bolt means 29 and the stringing devices are successively slid longitudinally of the conductor outwardly of the jaw means by use of the ear means 51G. Then the semi-tubular halves of the stringing devices are separated as shown in FIG. 13 and they fall away from the conductor.

Then the first bolt means of the first insulator is tightened by manipulation of the first head means 29C until it is separated from the remainder of the first bolt means by shearing at the portion of reduced diameter 29E. This causes the first and second jaw means to grip the conductor with the proper pressure to prevent damage to it as described above.

Then the same procedure is successively repeated until the conductor is installed between first and second jaw means of all of the insulators.

In use of the method for installing a three-phase transmission and distribution line of the type shown in FIG. 11, after installation of the first conductor, the same stringing method is repeated for installing the second conductor and then repeated again for installation of the third conductor.

The stringing device can be used many times because it can be rotated about its longitudinal axis to different positions when installed between the jaws of the insulator thereby preventing excessive wear on any portion of the inner surface of the circular opening 60 which would otherwise occur if it was always installed in the same position between the jaws.

The new stringing method is also much more economical than the prior art methods because it eliminates the necessity for the use of stringing roller blocks and the temporary support of the conductor while a stringing device is removed and the permanent insulator is installed.

The third jaw means 25E is used when the transmission or distribution line is changed from a straight line to an angle at one of the poles.

The third jaw means 25E may be used in connection with a stringing device all parts of which are made entirely of wear-resistant plastic when the angle B between the line sections 30B and 30C is about 5° or less.

However, when the angle B between the line sections is substantial, for example more than about 5°, a stringing device in which each of the semi-tubular members includes at least one metallic strip means 51N and 52N is recommended because the friction of the pulling ropes 65A, 65B, 65C etc. and/or the conductor cable passing through the circular passage of the stringing device at a substantial angle causes increased wear of the ends of the walls of the circular passage of the stringing device.

The method of installing a conductor cable on a transmission or distribution line in which sections of the line turn at one or more substantial angles at one or more poles is the same as the method for a substantially straight line except that the stringing devices are gripped between the third jaw means 25E and the substantially convex portions of the necks 21E of the insulator as shown in FIG. 18 and after the conductor cable has been strung and the stringing devices have been removed from the cable as shown in FIG. 13, the bolt 29 is tightened so that the conductor cable is gripped between the third jaw means and the necks 21E of the insulators.

While stringing devices which include metallic strip means are more expensive to manufacture than all plastic stringing devices, it may be desirable to stock only the former because they can be used on straight transmission or distribution lines as well as on lines portions of which turn at a substantial angle.

The insulator for electrical conductors and the methods of stringing electrical conductors described and claimed herein satisfy the long-felt needs and have attained the objects of the inventions as stated above.

While one desirable embodiment of insulator embodying the invention has been shown in the drawings, it is to be understood that this disclosure is for the purpose of illustration only, and that various changes in shape, proportion and arrangement of parts as well as the substitution of equivalent elements for those shown and described herein may be made without departing from the spirit and scope of the invention as set forth in the appended claims.

While one desirable embodiment of a method of stringing electrical conductors embodying this invention has been described and shown in the drawings, it is to be understood that this disclosure is for the purpose of illustration only and that the substitution of equivalent method steps for those described herein may be made without departing from the spirit and scope of the method invention as set forth in the appended claims.

We claim:

1. An insulator for electrical conductors which comprises,
   a body,
   first jaw means integral with one end of the body of the insulator, said first jaw means having a clamping surface,
   slide means,
   means for mounting said slide means in said one end of the body for longitudinal movement substantially normal to the first jaw means,
   second jaw means integral with said slide means, said second jaw means having a clamping surface facing the clamping surface of said first jaw means,
   first passage means extending through the wall of said one end of the body beneath said first jaw means,
   interiorly threaded second passage means extending longitudinally within said slide means with its axis substantially coinciding with the longitudinal centerline of said first passage means,
   first bolt means comprising a portion extending through said first passage means and into said second passage means, at least the portion of said first bolt means which extends into said second passage means being provided with an exteriorly threaded portion for engaging the threads of said second passage means, and third jaw means integral with said slide means, said third jaw means having a clamping surface and extending in a direction from said slide means opposite to the direction in which said second jaw means extends.

2. An insulator according to claim 1 wherein the body comprises a plurality of spaced fin means which extend outwardly therefrom generally normal to the longitudinal axis of the body.

3. An insulator according to claim 2 wherein the body comprises a neck portion above the upper fin means, the clamping surface of said third jaw means faces said neck portion of said body and the free end of said third jaw means is adjacent to the upper fin means, whereby upon rotation of said first bolt means a conductor can be gripped between said clamping surface of the third jaw means and said neck portion of the body.

4. An insulator according to claim 3 wherein said means for mounting said slide means comprises slot means in said one end of the body extending substantially normal to said first jaw means, a pair of groove means, one extending longitudinally of one side of said slot means and the other extending longitudinally of the other side of said slot means, and a pair of outwardly projecting members on opposite sides of said slide means, said outwardly projecting members being slidable longitudinally in said groove means.

5. An insulator according to claim 4 wherein the inner ends of said pair of outwardly projecting members of said slide means terminate at localities which are spaced inwardly from the end of said slide means which is opposite to said third jaw means, whereby upon unscrewing said first bolt means, the third jaw means end of said slide means can be rotated upwardly a sufficient distance to permit a conductor to be passed through the gap which is formed between the end of said third jaw means and the periphery of the upper fin means, and by rotation of the third jaw means downwardly and tightening said first bolt means, such conductor can be gripped between said clamping surface of said third jaw means and said neck portion of the body.

6. A method of stringing electrical conductor in a plurality of insulators including the steps of a. providing a plurality of insulator bodies each of which comprises a portion which includes a clamping surface;

b. providing a plurality of slide means each of which is slideable transversely of an insulator body and comprises jaw means having a clamping surface facing the clamping surface of its associated insulator body;

c. providing a plurality of bolt means for moving said slide means and said jaw means towards and away from the clamping surfaces of their associated insulator bodies;

d. providing a plurality of stringing devices each of which comprises first and second semi-tubular members having means for detachably securing them together to provide a circular passage between them, e. mounting a plurality of assembled insulators, slide means and bolt means on a series of poles of a distribution or transmission line, f. mounting a series of said stringing devices between said jaw means and said clamping surfaces of the bodies of the insulators by manipulation of said bolt means, g. pulling a conductor through the circular passages of said stringing devices, h. tensioning the conductor to provide the desired amounts of sag between the poles, i. opening said jaw means of the insulators by manipulation of the bolt means, j. sliding the stringing devices longitudinally of the conductor outwardly of the jaw means and the clamping surfaces of the bodies, k. separating the semi-tubular members of the stringing devices to remove them from the conductor, and l. closing said jaw means of the insulators to grip the conductor between them and said clamping surfaces of the bodies by manipulation of the bolt means to move said jaw means towards said clamping surfaces.

7. A method according to claim 6 wherein each of said bolt means comprises a portion of reduced diameter, and wherein said step of closing said jaw means includes moving the jaw means towards the clamping surfaces of the insulator bodies to grip the conductor by tightening the bolt means until they shear at said portions of reduced diameter thereby preventing damage to the conductor, the jaw means and the insulator bodies and preventing overstressing the bolt means.

8. A method according to claim 6 wherein one of each of said pairs of semi-tubular members of the stringing devices comprises ear means projecting outwardly from the periphery of said semi-tubular member, and wherein said step of sliding the stringing devices includes sliding each of the stringing devices longitudinally of the conductor outwardly of the jaw means and the associated clamping surfaces of the insulator body by manipulation of said ear means.

* * * * *